United States Patent
Kobayashi et al.

(10) Patent No.: US 10,857,964 B2
(45) Date of Patent: Dec. 8, 2020

(54) OCCUPANT PROTECTION DEVICE

(71) Applicant: AUTOLIV DEVELOPMENT AB, Vargarda (SE)

(72) Inventors: Yuto Kobayashi, Kanagawa (JP); Hiroyuki Taguchi, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 95 days.

(21) Appl. No.: 16/306,117

(22) PCT Filed: May 31, 2017

(86) PCT No.: PCT/JP2017/020304
§ 371 (c)(1),
(2) Date: Nov. 30, 2018

(87) PCT Pub. No.: WO2017/209192
PCT Pub. Date: Dec. 7, 2017

(65) Prior Publication Data
US 2019/0135219 A1 May 9, 2019

(30) Foreign Application Priority Data

Jun. 1, 2016 (JP) ................................. 2016-110495
Nov. 14, 2016 (JP) ................................. 2016-221976

(51) Int. Cl.
*B60R 21/207* (2006.01)
*B60N 2/42* (2006.01)
(Continued)

(52) U.S. Cl.
CPC .............. *B60R 21/207* (2013.01); *B60N 2/42* (2013.01); *B60R 21/233* (2013.01);
(Continued)

(58) Field of Classification Search
CPC ............ B60R 21/23138; B60R 21/233; B60R 21/207; B60R 2021/23107;
(Continued)

(56) References Cited

U.S. PATENT DOCUMENTS 7,669,888 B2   3/2010   Sato et al.
8,807,591 B2   8/2014   Nakata
(Continued)

FOREIGN PATENT DOCUMENTS

JP   2006-062566 A   3/2006
JP   2009-023494 A   2/2009
(Continued)

OTHER PUBLICATIONS

International Search Report of PCT/JP2017/020304 dated Aug. 8, 2017.

*Primary Examiner* — Drew J Brown
(74) *Attorney, Agent, or Firm* — Stephen T. Olson; Harness, Dickey & Pierce, P.L.C.

(57) ABSTRACT

A side airbag device for restraining an occupant at an initial stage of airbag deployment. A seatback includes a side support portion that bulges out in a vehicle advancement direction on a vehicle width direction side portion. A side frame having a frame side wall that extends in the vehicle advancement direction when a horizontal section is disposed in the interior of the side support portion. The side airbag device is housed on a vehicle width direction inner side of the frame side wall. An inflator is provided on the vehicle width direction inner side of the frame side wall to supply inflation gas to the airbag. An internal vent hole through which the inflation gas flows from a sub-chamber into a main chamber is provided in a partition between the main chamber and the sub-chamber. The sub-chamber deploys so as to overlap the frame side wall when seen from the side of the vehicle. The main chamber deploys without overlapping the frame side wall when seen from the side of the vehicle.

20 Claims, 19 Drawing Sheets

(51) Int. Cl.
  *B60R 21/2338* (2011.01)
  *B60R 21/2342* (2011.01)
  *B60R 21/233* (2006.01)

(52) U.S. Cl.
  CPC ...... *B60R 21/2338* (2013.01); *B60R 21/2342* (2013.01); *B60R 2021/23308* (2013.01)

(58) Field of Classification Search
  CPC ........... B60R 2021/23146; B60R 2021/23324; B60R 21/21
  See application file for complete search history.

(56) References Cited

U.S. PATENT DOCUMENTS

| | | | | |
|---|---|---|---|---|
| 2008/0238057 | A1* | 10/2008 | Inoue | B60R 21/01538 |
| | | | | 280/735 |
| 2009/0020988 | A1* | 1/2009 | Sato | B60R 21/23138 |
| | | | | 280/730.2 |
| 2013/0175792 | A1* | 7/2013 | Fukawatase | B60N 2/289 |
| | | | | 280/728.2 |
| 2015/0076802 | A1* | 3/2015 | Tanabe | B60R 21/207 |
| | | | | 280/730.2 |
| 2015/0115583 | A1 | 4/2015 | Azuma et al. | |
| 2016/0114751 | A1* | 4/2016 | Saito | B60N 2/42 |
| | | | | 297/216.13 |
| 2017/0174174 | A1* | 6/2017 | Ohno | B60R 21/235 |
| 2017/0182962 | A1* | 6/2017 | Hiraiwa | B60R 21/207 |
| 2017/0369020 | A1* | 12/2017 | Hiraiwa | B60N 2/99 |
| 2018/0186326 | A1* | 7/2018 | Kobayashi | B60R 21/239 |
| 2019/0023217 | A1* | 1/2019 | Ohno | B60R 21/233 |
| 2019/0084516 | A1* | 3/2019 | Fukawatase | B60R 21/207 |
| 2019/0135219 | A1* | 5/2019 | Kobayashi | B60N 2/42 |

FOREIGN PATENT DOCUMENTS

| | | |
|---|---|---|
| JP | 2013-151237 A | 8/2013 |
| JP | 2013-233863 A | 11/2013 |
| JP | 2014-080169 A | 5/2014 |
| JP | 2015-036256 A | 2/2015 |
| JP | 2016-078463 A | 5/2016 |

* cited by examiner

A1-A1 CROSS-SECTION

FIRST EMBODIMENT (A) WITH CONNECTING PANEL

A2-A2 CROSS-SECTION (B) WITHOUT CONNECTING PANEL

A2-A2 CROSS-SECTION

FIRST EMBODIMENT

SECOND EMBODIMENT

THIRD EMBODIMENT (A)

(B)

THIRD EMBODIMENT

FIFTH EMBODIMENT

A1-A1 CROSS-SECTION

FIFTH EMBODIMENT (A)

(B)

FIFTH EMBODIMENT

FIFTH EMBODIMENT

SEVENTH EMBODIMENT

OCCUPANT PROTECTION DEVICE

CROSS-REFERENCE TO RELATED APPLICATIONS

This application is a 35 U.S.C. § 371 national phase of PCT International Application No. PCT/JP2017/020304, filed May 31, 2017, which claims the benefit of priority under 35 U.S.C. § 119 to Japanese Patent Application No. 2016-110495, filed Jun. 1, 2016, and Japanese Patent Application No. 2016-221976, filed Nov. 14, 2016, the contents of which are incorporated herein by reference in their entirety.

FIELD OF THE INVENTION

The present invention relates to an occupant protection device including a side airbag device.

BACKGROUND

Providing one or a plurality of airbags in a vehicle to protect occupants when the vehicle is involved in an accident is well-known. Airbags take various forms, for example a so-called driver airbag that protects the driver by inflating from the vicinity of the center of the steering wheel of an automobile, a curtain airbag that deploys in a downward direction on the inside of a window of the automobile in order to protect an occupant during an accident in which the vehicle collides in a lateral direction, rolls onto its side, or rolls over, a side airbag that deploys between an occupant and a side panel to protect the occupant when the vehicle collides in the lateral direction, and so on. The present invention relates to a side airbag device provided in a vehicle seat and an occupant protection device including the side airbag device.

A side airbag device described in Japanese Patent Publication No. 2009-023494, for example, includes a main airbag and an auxiliary airbag. By inflating and deploying the auxiliary airbag before the main airbag, the occupant can be restrained at an early stage of a collision sequence. Other side airbag devices having an auxiliary airbag as well as a main airbag have been proposed in addition to the invention described in the above-referenced document. With this type of side airbag device, the region in which the device is disposed is greatly restricted, giving rise to strong demand for an increase in the compactness of the device.

There is also demand for an increase in deployment speed and stabilization of the deployment behavior and deployment shape in order to secure an appropriate occupant protection performance.

The present invention has been designed in consideration of the circumstances described above, and an object thereof is to provide a side airbag device capable of restraining an occupant quickly and appropriately, and an occupant protection device that includes the side airbag device.

A further object of the present invention is to provide a side airbag device that contributes to an improvement in device compactness and an occupant protection device that includes the side airbag device.

SUMMARY AND INTRODUCTORY DESCRIPTION OF THE INVENTION

To achieve the objects described above, the present invention is applied to an occupant protection device having: a vehicle seat that includes a seat cushion forming a seating surface, and a seatback forming a backrest; and a side airbag device housed in the seat. The seatback includes a side support portion that bulges out in a vehicle advancement direction (toward the front of a vehicle) on a vehicle width direction side portion (end portion) thereof. A side frame having a frame side wall that extends in the vehicle advancement direction when a horizontal section is seen from above is disposed in the interior of the side support portion. The side airbag device is housed on a vehicle width direction inner side of the frame side wall.

The side airbag device includes an airbag that is inflated and deployed in order to restrain an occupant, and an inflator provided on a vehicle width direction inner side of the frame side wall in order to supply inflation gas to the airbag.

An internal vent hole through which the inflation gas flows from a sub-chamber into a main chamber is provided in a partition between the main chamber and the sub-chamber.

The sub-chamber deploys so as to overlap the frame side wall when seen from a side of the vehicle. The main chamber, on the other hand, deploys without overlapping the frame side wall when seen from the side of the vehicle.

According to the present invention, configured as described above, the sub-chamber deploys in the interior of the side support portion at an initial stage of the operation of the airbag device, and therefore the occupant can quickly be restrained from moving toward the vehicle width direction outer side. At this time, the sub-chamber deploys so as to overlap the frame side wall when seen from the side of the vehicle, and therefore the frame side wall receives counterforce generated during deployment of the sub-chamber so that the sub-chamber reliably deploys toward a seat center side. Even after the sub-chamber has deployed, the frame side wall can receive pressure from the occupant, and therefore the occupant can be reliably restrained relative to a seat center direction.

Further, the side support portion deforms so as to project toward the occupant side, thereby taking a form with which the occupant is pushed toward the vehicle width direction inner side, and generation of force for pushing the occupant diagonally frontward from the direction of the back of the occupant can thus be avoided or suppressed to a minimum. As a result, movement of the occupant in a direction for withdrawing a seatbelt can be avoided. In other words, the risk of injury to the occupant can be suppressed and an optimum restraining performance can be exhibited. As long as the sub-chamber deploys only in the interior of the side support portion, the side support portion deforms and projects sufficiently, and as a result, more of the generated gas can be diverted to the main chamber.

The main chamber, meanwhile, deploys without overlapping the frame side wall when seen from the side of the vehicle, and therefore deployment thereof is not obstructed by the side frame and the sub-chamber. As a result, the main chamber can deploy quickly and smoothly.

According to another aspect of the present invention, the main chamber is structured to include a non-inflating region in a part thereof that overlaps the frame side wall when seen from the side of the vehicle.

By employing this structure, similar actions and effects to those of the aspect described above can be obtained, and in addition, further stabilization of the deployment behavior and deployment shape of the main chamber can be expected.

According to a further aspect of the present invention, the main chamber deploys so that a vehicle rear-side edge thereof, when seen from the side of the vehicle, follows the shape of a vehicle front-side edge of the frame side wall.

By employing this structure, when the main chamber deploys toward the front of the vehicle, the rear edge of the main chamber and the front edge of the frame side wall remain in close contact so that the entire front edge of the frame side wall acts as a force-counteracting surface, and as a result, the frontward deployment behavior and deployment shape of the main chamber are stabilized.

Moreover, in the present invention, the inflator and/or the entire airbag device may be housed on the vehicle width direction outer side of the frame side wall. By employing this configuration, advantages such as facilitating attachment of the airbag device can be obtained.

A tether that can be fastened to a vehicle rear part of the frame side wall on a vehicle outer side of the frame side wall may be provided on a vehicle rear-side end of the main chamber. Here, the tether can be fastened to a stud bolt for fixing the inflator to the frame, for example.

By securing the rear end of the main chamber using the tether, the front-rear direction deployment behavior and deployment shape of the main chamber can be restricted.

The main chamber may be divided into a plurality of chambers including a waist portion restraining chamber for protecting a waist portion of the occupant. Here, the waist portion restraining chamber is preferably provided in a lower portion of the main chamber. Further, the internal vent may be structured to include a first vent through which the waist portion restraining chamber and the sub-chamber communicate.

By providing the waist portion restraining chamber in the main chamber, the waist portion of the occupant can be restrained over a wide range in the front-rear direction of the vehicle, leading to an improvement in the restraining performance.

A region of the main chamber above the waist portion restraining chamber may be divided into an upper front chamber and an upper rear chamber. As a result, the main chamber is constituted by three chambers. By employing this structure, the required chamber, within the comparatively large-volume main chamber, can be deployed rapidly, thereby restraining the occupant reliably. Moreover, the chamber can be deployed selectively so as to protect sites that need to be restrained quickly.

The sub-chamber may be provided to extend along the waist portion restraining chamber and the upper rear chamber, and the internal vent may include a first vent through which the waist portion restraining chamber and the sub-chamber communicate and a second vent through which the upper rear chamber and the sub-chamber communicate. By employing this structure, the inflation gas from the inflator housed in the sub-chamber can be delivered quickly to the upper and lower regions of the main chamber.

A division of the main chamber between the waist portion restraining chamber and a region thereabove may be formed by sewing or a dividing wall (a baffle).

A structure in which the sub-chamber deploys only in the interior of the side support portion may be employed. In this case, lateral direction movement of the occupant can be restrained by the sub-chamber, which has the minimum required volume. If the sub-chamber were to bulge out by a large amount beyond the side support portion, a larger inflator would be required to secure sufficient internal pressure in the chamber.

A configuration in which the sub-chamber is deployed on the seat center side of a vehicle advancement direction extension line of the frame side wall and the main chamber is pushed by deployment of the sub-chamber toward the vehicle width direction outer side so as to be deployed in front of the frame side wall may be employed. In this case, the functions of the main chamber and the sub-chamber can be exhibited reliably. More specifically, the waist portion of the occupant can be restrained quickly by the sub-chamber, whereupon the occupant can be restrained by the main chamber over a wide range from a trunk portion to a shoulder portion. As a result, the occupant is protected reliably in the lateral direction.

A start point region that serves as a start point when the side support portion bends toward the occupant side in response to inflation of the sub-chamber is preferably formed in the side support portion. In so doing, the side support portion can be bent more easily by the force with which the sub-chamber of the airbag deploys, and as a result, the occupant can be reliable restrained from moving toward the vehicle width direction outer side immediately after a collision accident occurs. Note that the start point region may take the form of a notch, a recess, a reduced-thickness region, or a combination thereof.

The sub-chamber is preferably disposed in a lower portion of the side support portion so that when the sub-chamber deploys, the waist portion of the occupant is pushed from the side by the side support portion. By pushing the waist portion, which is close to the center of gravity of the human body, the occupant restraining performance at the initial stage of an accident is improved.

Webbing that covers at least a part of the main chamber and the sub-chamber may be further provided. The webbing preferably includes a fragile portion that serves as a rupturing start point when the sub-chamber deploys. By rupturing the webbing using the sub-chamber, which deploys only in the interior of the side support and has a comparatively small volume and therefore a comparatively short deployment time, smooth deployment of the main chamber can be promoted. In other words, the main chamber inflates rapidly from the part where the webbing ruptures and can therefore be deployed rapidly on the outside of the side support.

The webbing may be constituted by first webbing positioned on a vehicle outer side of the side airbag and second webbing positioned on a vehicle inner side of the side airbag. Further, a wire that joins a vehicle rear part of the first webbing to a vehicle rear part of the second webbing may be provided.

The webbing itself assists rupturing of a covering of the seat (the side support portion) during deployment of the airbag, while the wire enhances the effect thereof. Tension exerted on the webbing when the airbag deploys can be increased by the wire so that during deployment, rupturing of the seat covering can be completed at an earlier timing. Accordingly, the timing at which the occupant is moved in the lateral direction by the sub-chamber can be advanced, and as a result, the occupant restraining effect during full deployment of the main chamber can be enhanced.

Note that the side airbag according to the present invention is assumed to include a type that deploys on the vehicle center side of the seat as well as a type that deploys on the door side (the outer side) of the seat. Examples of side airbags that deploy on the vehicle center side of the seat include a far side airbag, a front center airbag, a rear center airbag, and so on.

DETAILED DESCRIPTION

A vehicle seat installed with a side airbag device according to embodiments of the present invention will be described below on the basis of the attached figures. Note that in the figures, the term "front" refers to the front of the vehicle (an advancement direction), "rear" refers to the rear of the vehicle (an opposite side to the advancement direction), "inner" refers to a vehicle width direction inner side (an occupant side), and "outer" refers to a vehicle width direction outer side (a door panel side).

Figure 1:
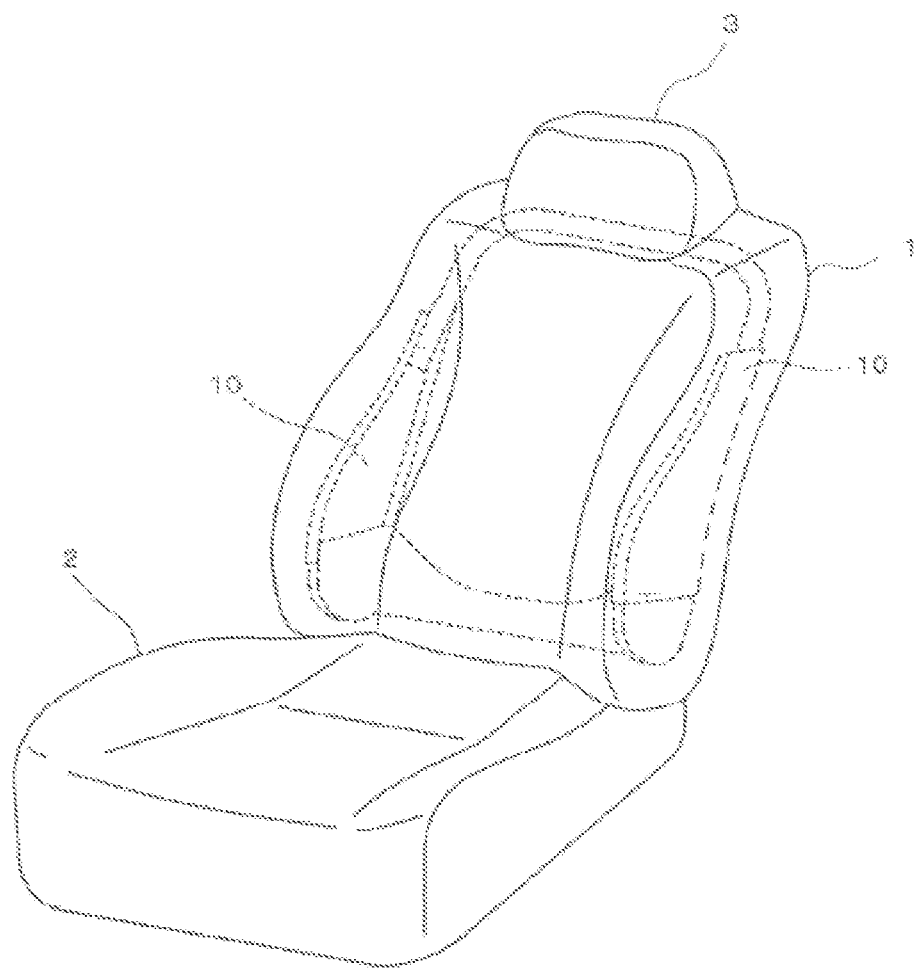
FIG. 1 is a perspective view mainly showing the outer appearance of a vehicle seat used in an occupant protection device according to the present invention, but not showing an airbag unit.
Figure 2:
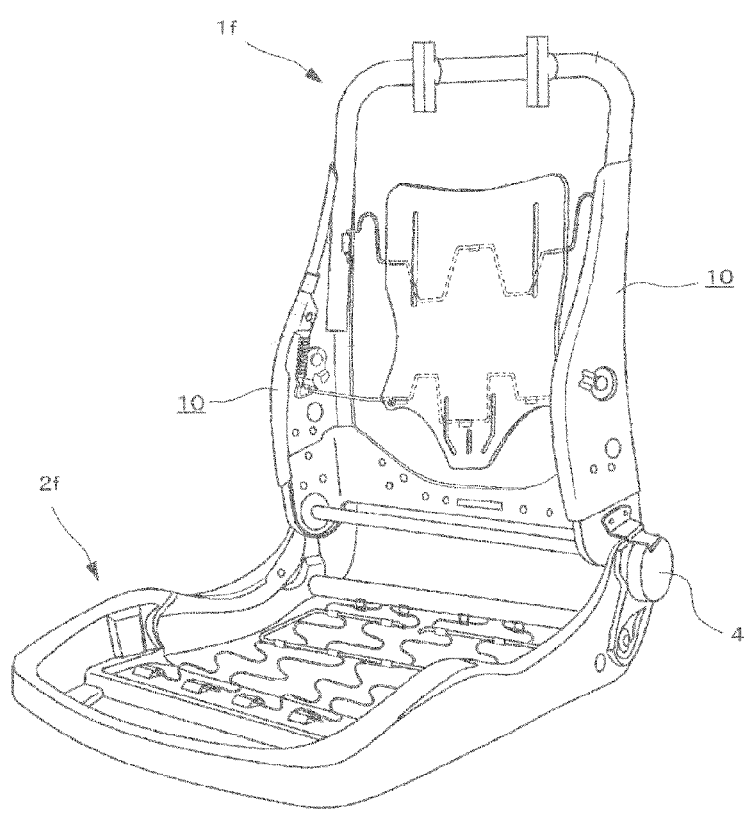
FIG. 2 is a perspective view showing an interior structure (a seat frame) functioning as a framework of the vehicle seat shown in FIG. 1, but not showing the airbag unit.
Figure 3:
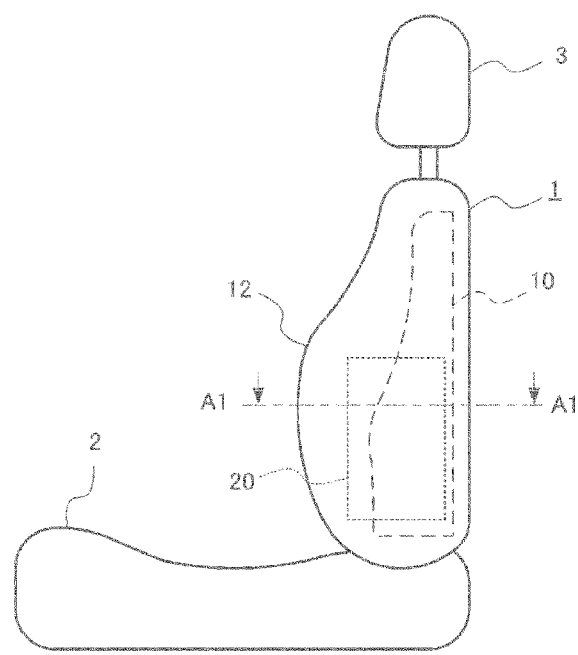
FIG. 3 is a schematic side view of the occupant protection device according to the present invention, showing the airbag unit in a housed state from a vehicle width direction outer side.
Figure 3:
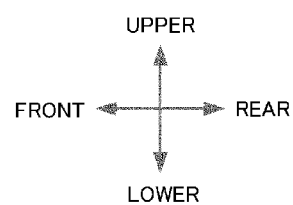

FIG. 1 is a perspective view mainly showing the outer appearance of a vehicle seat used in an occupant protection device according to the present invention, but not showing an airbag device 20. FIG. 2 is a perspective view showing an interior structure (a seat frame) functioning as a framework of the vehicle seat shown in FIG. 1, but likewise not showing the airbag device 20. FIG. 3 is a schematic side view of the occupant protection device according to the present invention, showing a state in which the airbag device 20 is housed in a side face (a near side) of the vehicle seat close to a door from the vehicle width direction outer side.

The present invention is an occupant protection device including a vehicle seat and a side airbag device 20 housed in the seat. As shown in FIGS. 1 and 2, the vehicle seat according to this embodiment, when viewed as a site, is constituted by a seat cushion 2 in a part on which an occupant sits, a seatback 1 forming a backrest, and a headrest 3 connected to an upper end of the seatback 1.

A seatback frame 1f forming a skeleton of the seat is provided in the interior of the seatback 1, and pads formed from urethane foamed material or the like are provided on the surface and periphery thereof. The surfaces of the pads are covered in a covering 14 made of leather, fabric, or the like. A seating frame 2f is disposed on a bottom side of the seat cushion 2, and pads formed from urethane foamed material or the like are provided on the upper surface and periphery thereof. The surfaces of the pads are covered in a covering 14 (FIG. 4) made of leather, fabric, or the like. The seating frame 2f and the seatback frame 1f are connected via a reclining mechanism 4.

As shown in FIG. 2, the seatback frame 1f is formed in a frame shape and constituted by a side frame 10 disposed on each of the left and right sides so as to extend in an up-down direction, an upper frame connecting respective upper ends of the side frames 10, and a lower frame connecting respective lower ends thereof. The headrest 3 is formed by providing a cushion material on the outer side of a headrest frame.

Figure 4:
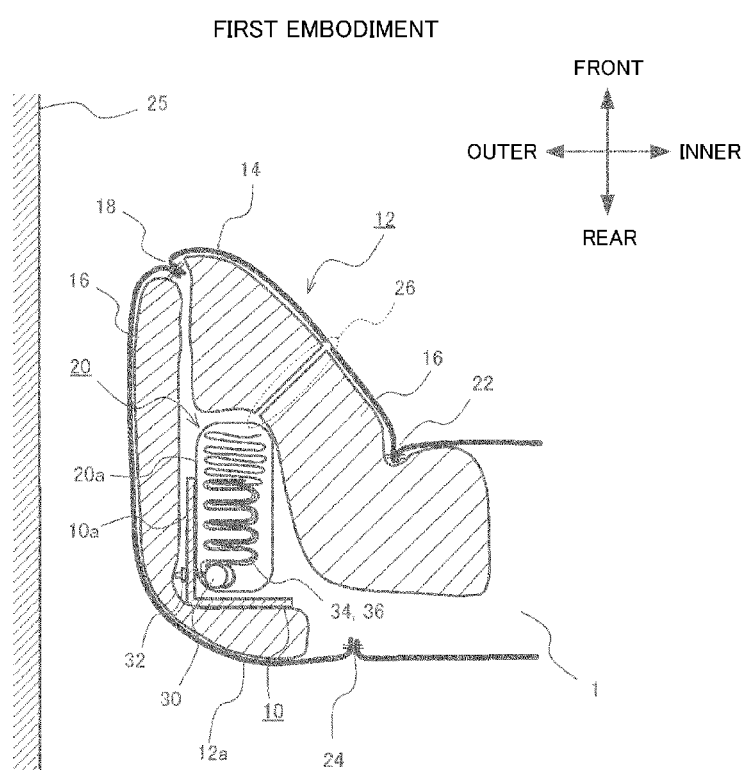
FIG. 4 is a sectional view showing the structure of an occupant protection device according to a first embodiment of the present invention and corresponding to a partial cross-section taken in an A1-A1 direction in FIG. 3.
Figure 5:
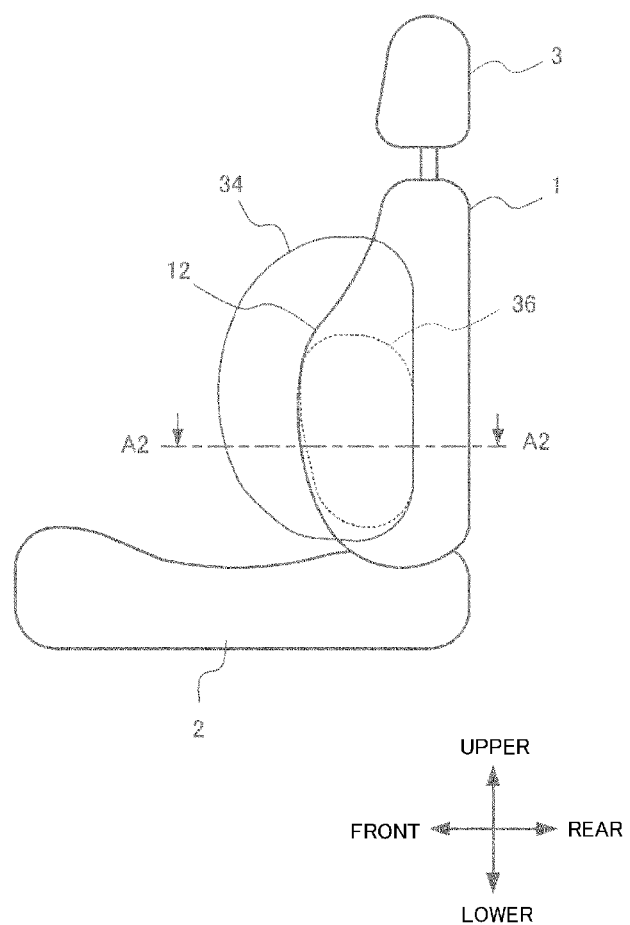
FIG. 5 is a schematic side view of the occupant protection device according to the present invention, showing an airbag in a deployed state from the vehicle width direction outer side.

FIG. 4 is a sectional view showing the structure of an occupant protection device according to a first embodiment of the present invention and corresponding to a partial cross-section taken in an A1-A1 direction in FIG. 3. FIG. 5 is a schematic side view of the occupant protection device according to the first embodiment, showing an airbag in a deployed state from the vehicle width direction outer side.

The side frame 10 is formed from resin or metal, and as shown in FIG. 4, can be formed to have an L-shaped cross-section or a C-shaped cross-section. The side frame 10 includes a frame side wall 10a that extends in a vehicle advancement direction when viewing a horizontal section from above. An airbag module (a side airbag device) 20 is fixed to an inner side (a seat center side) of the frame side wall 10a.

As shown in FIG. 4, the seatback 1 includes a side support portion 12 that bulges in the vehicle advancement direction (toward the front of the vehicle) on a vehicle width direction side portion (end portion) thereof. The side airbag device 20 is housed in the interior of the side support portion 12 in a gap where a urethane pad 16 is not disposed. The side airbag device 20 includes an airbag 34, 36 that is inflated and deployed so as to restrain an occupant, and an inflator 30 for supplying inflation gas to the airbag 34, 36.

Seams 18, 22, 24 of the covering 14 on the seatback 1 are woven into the inner side and connected by sewing. Note that the front seam 18 ruptures when the airbag deploys.

Figure 6:
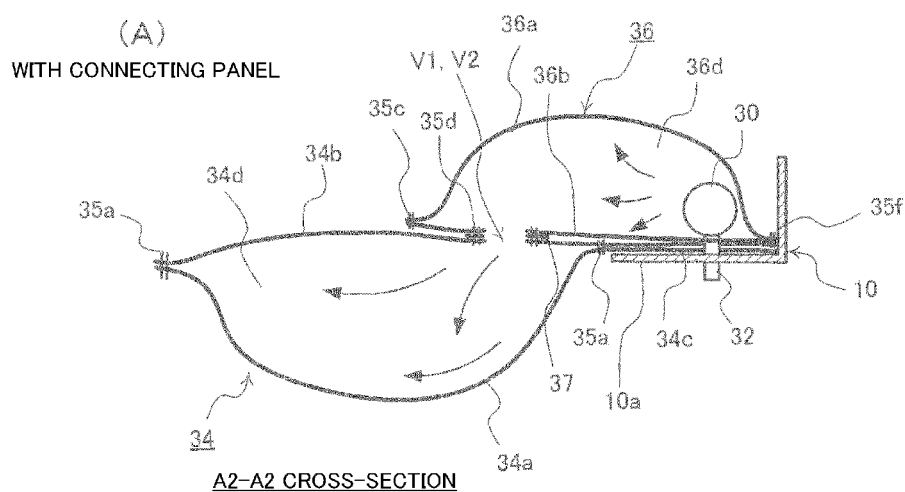
FIGS. 6(A) and 6(B) are sectional views corresponding to the first embodiment and showing a deployment state of the airbag on a cross-section taken in an A2-A2 direction in FIG. 5, FIGS. 6(A) and 6(B) showing different aspects thereof.
Figure 6:
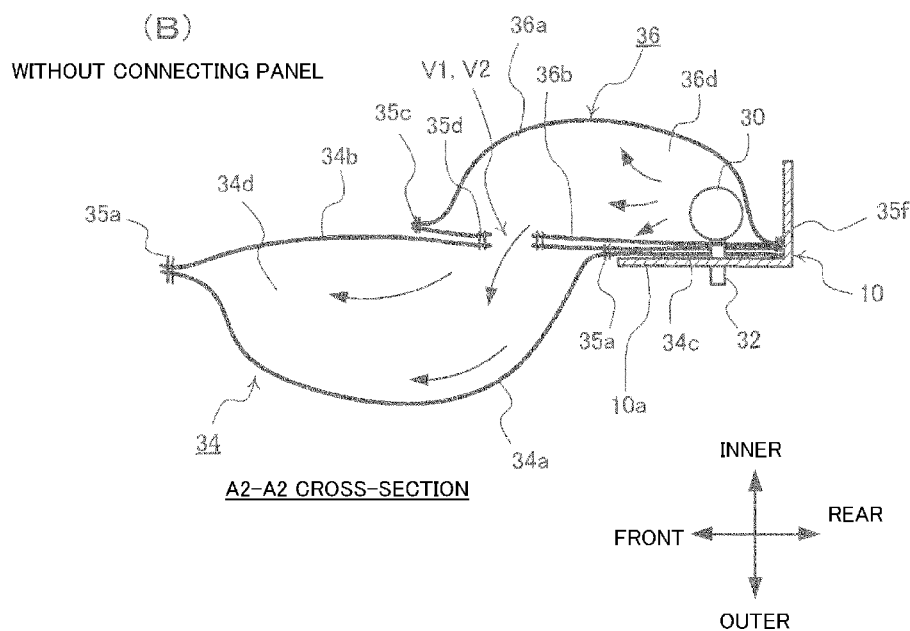

Further, a start point region 26 that serves as a start point when the side support portion 12 bends toward the occupant side in response to inflation of a sub-chamber 36 (see FIGS. 5 and 6) is formed in the side support portion 12. The start point region 26 may take the form of a notch, a recess, a reduced-thickness region, or a combination thereof. The start point region 26 may be formed only in the urethane 16 part in the interior of the side support portion 12. Alternatively, the start point region 26 may be omitted.

The airbag 34, 36 is covered by a soft cover 20a made of fabric. As regards the relationship between a main chamber 34 and the sub-chamber 36, the airbag 34, 36 may be folded or rolled into a spiral shape ("folding" includes rolling). Alternatively, another optimum compression method may be employed as appropriate. In FIG. 4, a reference numeral 25 denotes a door trim. Although not shown in detail in the figure, in a state where the airbag is folded and housed, the sub-chamber and the main chamber are folded integrally so as to overlap when opened out flat into a planar state, whereby a positional relationship therebetween is maintained during inflation and deployment. In a case where the sub-chamber and the main chamber are folded individually, the folded sub-chamber part may be disposed either in a position closer to the inflator than the folded main chamber part or between the folded main chamber part and the side frame. In other words, the folded sub-chamber may be disposed on the occupant side of the folded main chamber.

As shown in FIG. 5, the airbag 34, 36 includes the main chamber 34, which deploys toward the front of the side support portion 12, and the sub-chamber 36, which deploys on the vehicle width direction inner side of the main chamber 34.

Basically, the sub-chamber 36 deploys so as to overlap the frame side wall 10a when seen from the side of the vehicle whereas the main chamber 34 deploys without overlapping the frame side wall 10a when seen from the side of the vehicle.

The sub-chamber 36 causes at least a front side part 14 of the side support portion 12 to deform so that the front side part 14 projects toward the occupant side. Further, the sub-chamber 36 is disposed in the lower portion of the side support portion 12 (see FIG. 5) so that when the sub-chamber 36 deploys, the side support portion 12 contacts and presses against a waist portion of the occupant. By pressing against the waist portion, which is near the center of gravity of the human body, an occupant restraining performance during the initial stage of an accident is improved. The volume of the sub-chamber 36 is set to be smaller than the volume of the main chamber 34. The shape and volume of the sub-chamber are preferably adjusted so that the sub-chamber 36 deploys only in the interior of the side support portion 12. In other words, the sub-chamber 36 may be configured so as not to project further toward the front of the vehicle than a front end of the ruptured side support portion 12 when deployed. In so doing, the sub-chamber can be fully deployed earlier than the main chamber, and a larger amount of gas can be charged into the main chamber.

The main chamber 34 may be set to deploy toward the outer side in front of the side support portion 12. This can be achieved in accordance with the manner in which the airbag is folded, the manner in which the folded airbag is disposed, the gas injection direction of the inflator, the direction in which gas flows between the sub-chamber and the main chamber, and so on. In so doing, deployment of the main chamber is less likely to be obstructed by deployment of the sub-chamber, and as a result, the main chamber deploys smoothly. By ensuring that the main chamber is deployed cooperatively with deployment of the sub-chamber, the occupant protection performance is improved.

Figure 7:
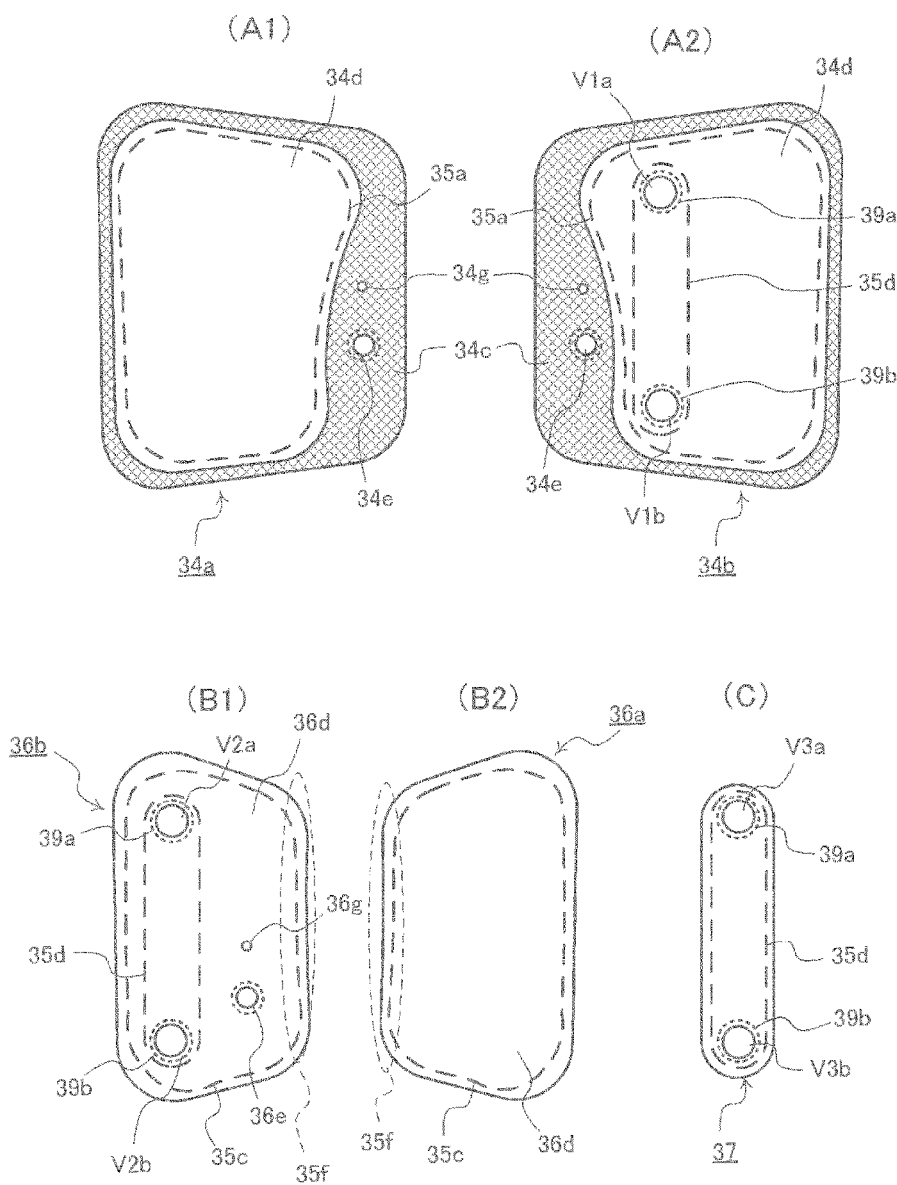
FIGS. 7(A1), 7(A2), 7(B1), 7(B2) and 7(C) are plan views showing constituent components of the airbag used in the occupant protection device according to the first embodiment of the present invention, FIGS. 7(A1) and 7(A2) showing panels forming a main chamber, FIGS. 7(B1) and 7(B2) showing panels forming a sub-chamber, and FIG. 7(C) showing a connecting panel.

FIGS. 6A) and 6(B) are schematic views showing a deployment state of the airbag and corresponding to a cross-section taken in an A2-A2 direction in FIG. 5, wherein FIG. 6(A) shows an aspect in which a connecting panel 37 is used and FIG. 6(B) shows an aspect in which the connecting panel 37 is not used. FIGS. 7(A1), 7(A2), 7(B1), 7(B2) and 7(C) are plan views showing constituent components of the airbag used in the occupant protection device according to the present invention, FIGS. 7(A1) and 7(A2) showing panels forming the main chamber 34, FIGS. 7(B1) and 7(B2) showing panels forming the sub-chamber 36, and FIG. 7(C) showing the connecting panel 37.

In this embodiment, as shown in FIGS. 6(A) and 6(B), the inflator 30 is housed in the interior of the sub-chamber 36. A cylinder type inflator having a cylindrical shape, for example, can be used as the inflator 30. An upper-lower pair of stud bolts 32 project from an outer peripheral portion of the inflator 30 toward the vehicle width direction inner side. The stud bolts 32 are attached (fastened fixedly) to the side frame 10 by nuts. A plurality of gas ejection ports arranged in a circumferential direction are formed in the inflator 30, and gas is ejected radially from the gas ejection ports. Note that a diffuser for controlling the flow of the gas may be provided as necessary.

An airbag control ECU installed in the vehicle is electrically connected to the inflator 30. A satellite sensor that detects a side collision is electrically connected to the airbag control ECU. The inflator 30 can be configured so as to operate when the airbag control ECU detects a side collision on the basis of a signal from the satellite sensor.

As shown in FIG. 6(A) and FIGS. 7(A1) and 7(A2), two panels 34a, 34b forming the main chamber 34 are formed in an identical shape, and an inflating region 34d is formed therein by sewing 35a. As shown in FIG. 6(A) and FIGS. 7(B1) and 7(B2), meanwhile, two panels 36a, 36b forming the sub-chamber 36 are formed in an identical shape, and an inflating region 36d is formed therein by sewing 35c on an outer edge thereof.

Vent holes V1a, V1b communicating with the main chamber 34 and the sub-chamber 36 are formed in the inside panel 34b of the main chamber 34 so that inflation gas in the interior of the sub-chamber 36 flows into the main chamber 34 through vent holes V2a, V2b.

In the aspect shown in FIG. 6(A), the connecting panel 37 is interposed between the inside panel 34b of the main chamber 34 and the inside panel 36b of the sub-chamber 36. Connecting vent holes V3a, V3b are formed in the connecting panel 37 in positions corresponding to the vent holes (V1a, V2a), (V1b, V2b) in the panels 34b, 36b. Note that the aspect shown in FIG. 6(B) is structurally identical to the aspect shown in FIG. 6(A) except that the connecting panel 37 is omitted.

In the main chamber 34, a non-inflating region 34c is formed on a vehicle rear side of the inflating region 34d, and this region 34c is disposed in close contact with the side wall 10a of the side frame 10. Holes 34e through which the inflator 30 is passed and holes 34g through which the bolts 32 are passed are formed in the non-inflating region 34c in corresponding locations of the inner and outer panels 34a, 34b. Further, a hole 36e through which the inflator 30 is passed and a hole 36g through which the bolts 32 are passed are formed similarly in the inside panel 36b of the sub-chamber 36. Note that in this embodiment, an inflator quick install method (a method in which a harness connection-side end of the inflator is exposed) is described as an example, but a method of housing the entire inflator in the bag interior so that only holes for passing the bolts are formed may be employed instead.

To manufacture (sew) the airbag having the structure described above, first, the outer edge 35a of the inflating region 34d of the main chamber 34 is sewn, whereupon the connecting panel 37 is connected to a corresponding location on the inside panel 34b by sewing 35d. Further, respective peripheries of the vent holes V1 (V1a, V2a, V3a) and the vent holes V2 (V1b, V2b, V3b) are connected by sewing 39a, 39b. Note that in FIGS. 6(A) and 6(B), to facilitate understanding of the overall structure, the sewing 39a, 39b has been omitted. The outer edge 35c of the sub-chamber 36 is sewn in parallel, but at this point, a rear end 35f is not sewn. Next, the inflator 30 is disposed in the interior of the sub-chamber 36 and the bolts 32 are drawn out to the outside of the side panel 10. Further, the inside panel 36b of the sub-chamber 36 and the connecting panel 37 are sewn together by the sewing portion 35d and thereby connected. Finally, the rear end 35f of the sub-chamber 36 is closed by sewing. At this time, the rear end 35f of the sub-chamber 36 is preferably connected to the main chamber 34 by sewing. Thus, the main chamber 34 and the sub-chamber 36 can be prevented from fluttering during deployment of the airbag.

In the present invention, the main chamber 34 and the sub-chamber 36 are basically connected only by the vent hole periphery 35d. By not sewing the entire outer edge of the main chamber 34 and the sub-chamber 36, deployment of one of the chambers is not obstructed by the other chamber. In other words, during deployment of the airbag, interference between the main chamber 34 and the sub-chamber 36 can be suppressed to a minimum, and as a result, the deployment behavior of the respective chambers can be stabilized, sufficient thickness can be secured, and a collision absorption performance can be improved.

Figure 8:
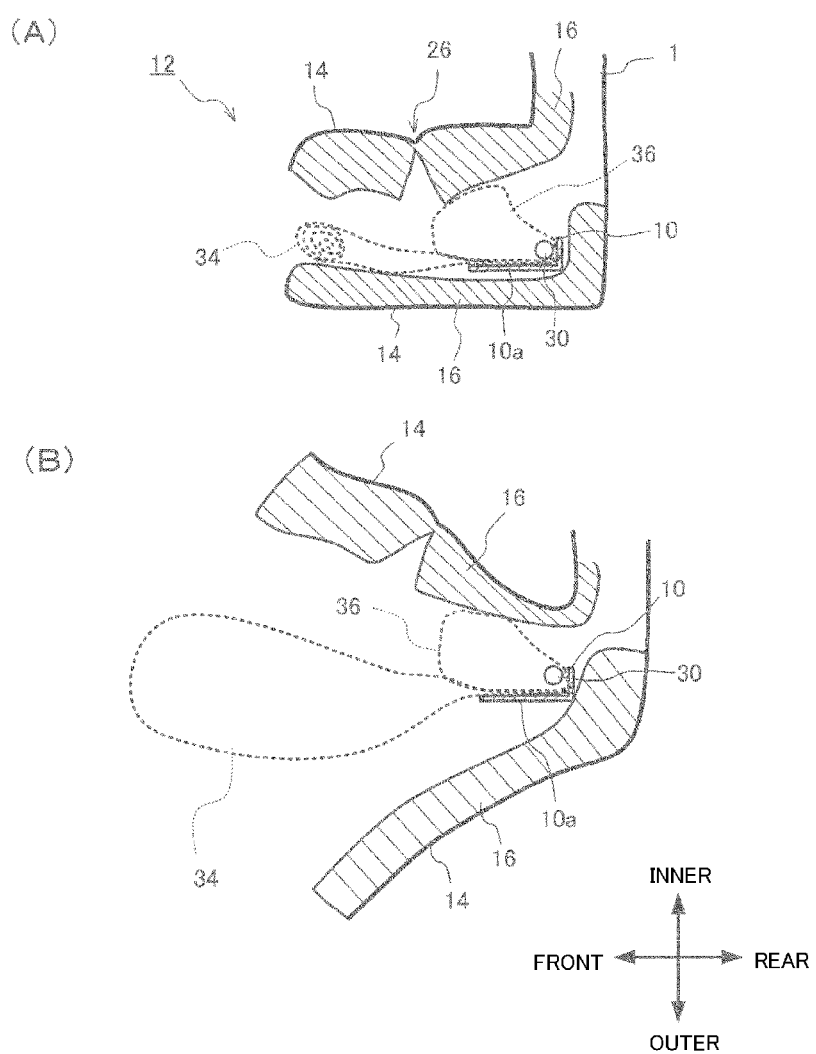
FIGS. 8(A) and 8(B) are illustrative views showing the deployment state of the airbag device according to the first embodiment of the present invention, FIG. 8(A) showing an initial deployment stage and FIG. 8(B) showing a later deployment stage.

FIGS. 8(A) and 8(B) are illustrative views showing the deployment state of the airbag device according to the first embodiment, FIG. 8(A) showing an initial deployment stage and FIG. 8(B) showing a later deployment stage.

As shown in FIG. 8(A), in the first embodiment of the present invention, configured as described above, in an initial stage of the operation of the airbag device 20, the sub-chamber 36 deploys in the interior of the side support portion 12 such that the seat covering 14 ruptures from the sewed portion 18 while the tip end side of the side support portion 12 deforms using the region 26 as a start point so as to bend or project toward the vehicle inner side. As a result, the occupant is restrained so as to be pushed toward the vehicle width direction inner side.

Note that at the point where inflation of the sub-chamber 36 is complete, the main chamber 34 has not yet finished inflating. The front side part of the side support portion 12 deforms so as to project toward the occupant side, and therefore generation of force for pushing the occupant diagonally frontward from the direction of the back of the occupant can be avoided or suppressed to a minimum. As a result, movement of the occupant in a direction for withdrawing a seatbelt can be avoided. In other words, the risk of injury to the occupant can be suppressed and an optimum restraining performance can be exhibited.

Next, when the airbag 34, 36 inflates further, as shown in FIG. 8(B), the main chamber 34 deploys fully toward the front of the vehicle, thereby protecting the occupant during the collision.

Figure 9:
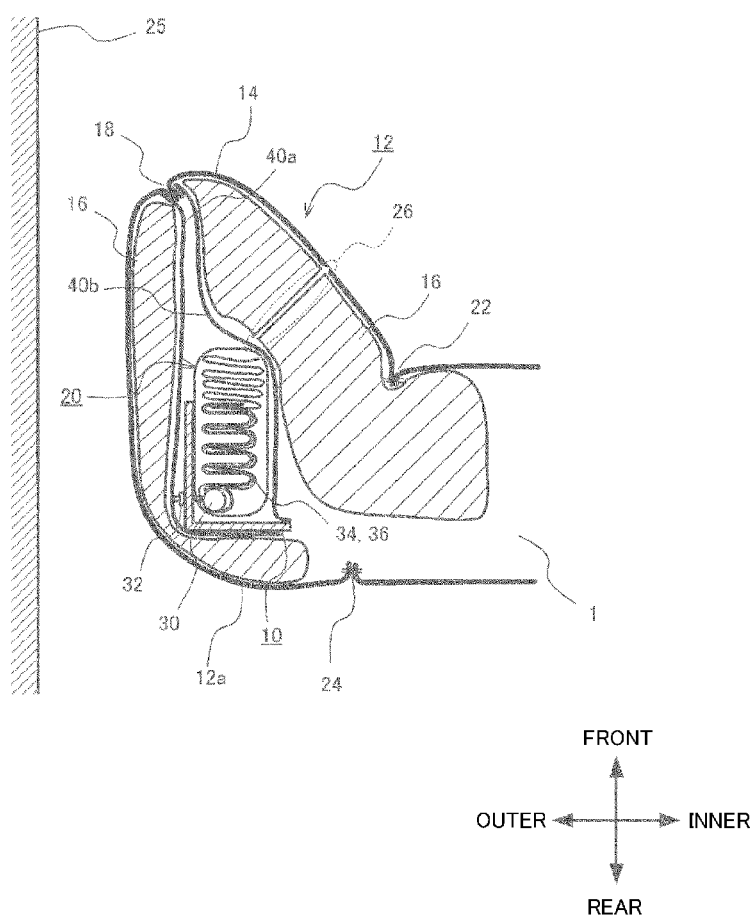
FIG. 9 is a sectional view showing an occupant protection device according a second embodiment of the present invention, in which directions match those of FIG. 4. Note that for convenience, the interior of an airbag unit is not depicted.
Figure 10:
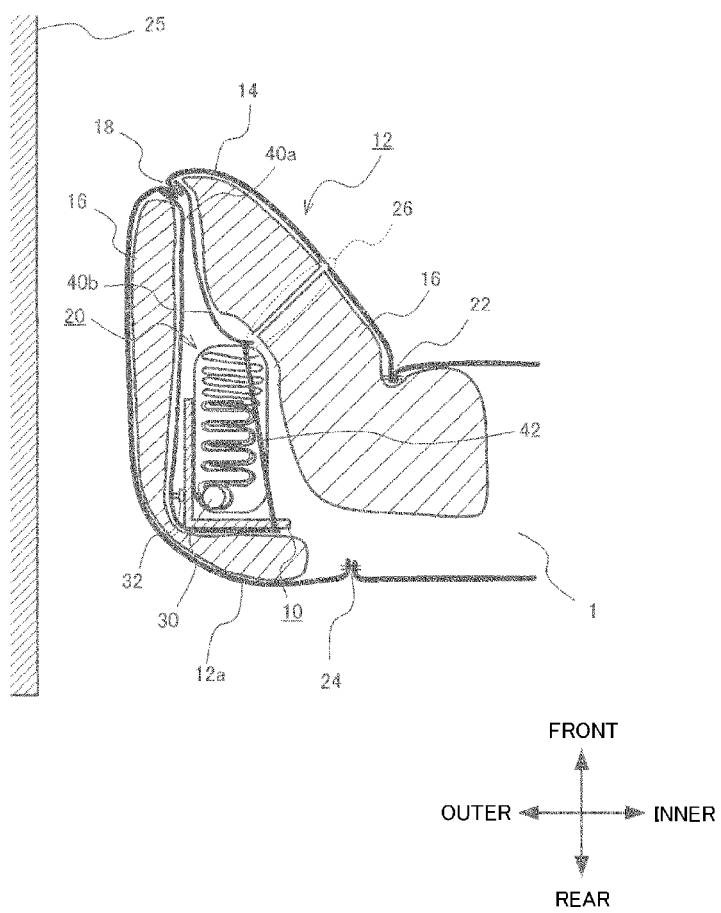
FIG. 10 is a sectional view showing a modified example of the aspect shown in FIG. 9.

FIG. 9 is a sectional view showing an occupant protection device according a second embodiment of the present invention, in which the directions match those of FIG. 4. FIG. 10 is a sectional view showing a modified example of the aspect shown in FIG. 9. The embodiment shown in FIGS. 9 and 10 further includes webbing 40a, 40b covering at least a part of the main chamber 34 and the sub-chamber 36.

The webbing 40a, 40b transmits energy generated when the airbag is inflated and deployed efficiently to the urethane structures of the seat and so on so that the seat itself ruptures early, leading to improvements in the deployment speed of the bag and the occupant protection performance, and is constituted by first webbing 40a positioned on the vehicle outer side of the side airbag and second webbing 40b positioned on the vehicle inner side. Front end parts of the webbing 40a, 40b are joined to the vicinity of the seam 18 of the seat in the front part of the seatback, and rear end parts of the webbing 40a, 40b are joined to a part of the seat frame 10 to the rear of the airbag.

The webbing 40a, 40b preferably includes a fragile portion that serves as a rupturing start point during deployment of the sub-chamber 36. The fragile portion is normally provided near the rupturing portion of the seat, but is preferably provided in a location where the remaining webbing does not cause an obstruction when the main bag is inflated and deployed so as to fly out toward the front of the vehicle. The sub-chamber 36, which deploys only in the interior of the side support portion 12, is preferably configured to have a comparatively small volume and a comparatively short deployment time. Therefore, by causing the webbing 40a, 40b to act as the sub-chamber 36 deploys, smooth deployment of the main chamber 34 can be promoted. In other words, due to the action of the webbing 40a, 40b, the energy generated when the airbag is inflated and deployed is transmitted efficiently to the urethane parts of the seat so that the seat ruptures quickly, and as a result, the main chamber 34 inflates and projects instantly through the ruptured part. The main chamber 34 can thus be deployed rapidly on the outside of the side support portion 12.

As shown in FIG. 10, one of the two pieces of webbing, in this case the second webbing 40b, may be formed to be slightly shorter, and a rear part thereof may be connected by a wire 42. A vehicle rear part of the first webbing 40a and a vehicle rear part of the wire 43 joined to the vehicle rear part of the second webbing 40b may be joined to the part of the seat frame 10 to the rear of the airbag. The webbing 40a, 40b and the wire 42 are connected by providing a reinforced part (overlapped fabric) capable of holding a wire on the ends of the webbing 40a, 40b and fixing the wire 42 using a stapler or the like. Alternatively, ring fittings through which a wire can be passed may be provided on the ends of the webbing 40a, 40b, and the wire 42 may be passed therethrough. The wire 42 may be provided singly or in a plurality, and when a plurality of wires 42 are provided, the wires may be parallel or non-parallel and, in certain cases, provided in mesh form.

The webbing 40a, 40b itself assists rupturing of the covering 14 of the side support portion 12 during deployment of the airbag 34, 36, while the wire 42 enhances the effect thereof. The wire 42 is almost completely non-stretching, and therefore tension exerted on the webbing 40a, 40b when the airbag deploys can be increased by the wire 42 so that during deployment, rupturing of the seat covering 14 can be completed at an earlier timing. Accordingly, the timing at which the occupant is moved in the lateral direction by the sub-chamber 36 can be advanced, and as a result, the occupant restraining effect during full deployment of the main chamber 34 can be enhanced. Instead of the example described above, the wire may be provided on the first webbing or on both the first webbing and the second webbing. Further, the webbing is preferably formed in the shape of a wide band, but as long as economic circumstances allow, the webbing can be formed so as to cover the maximum possible surface area. The webbing is preferably provided in a position including a central part of the stored airbag in the up-down direction.

Figure 11:
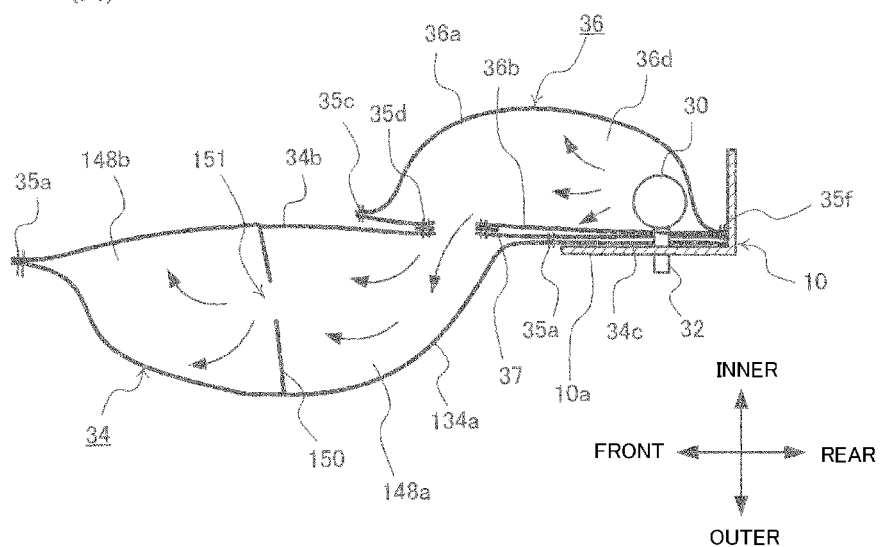
FIGS. 11(A) and 11(B) are schematic views showing the deployment state of an airbag device according to a third embodiment of the present invention, FIG. 11(A) corresponding to a cross-section taken in the A2-A2 direction in FIG. 5 and FIG. 11(B) showing a state seen from the vehicle width direction outer side.
Figure 11:
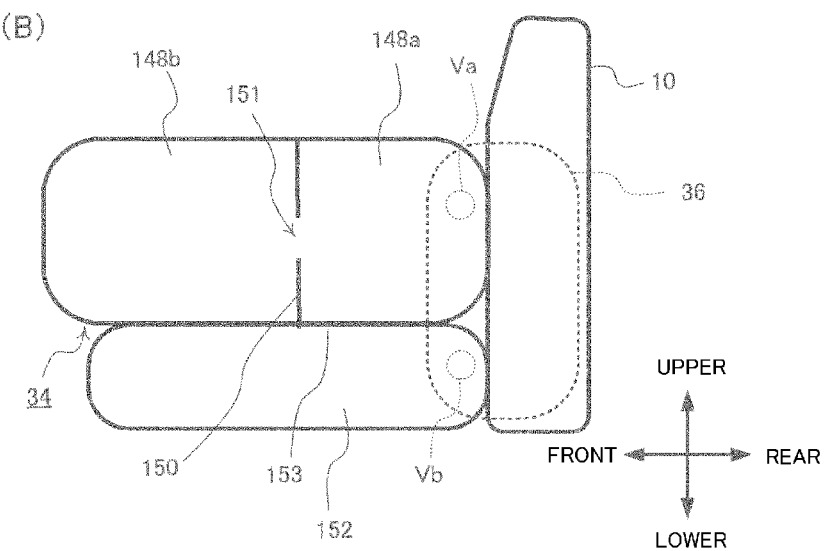
Figure 12:
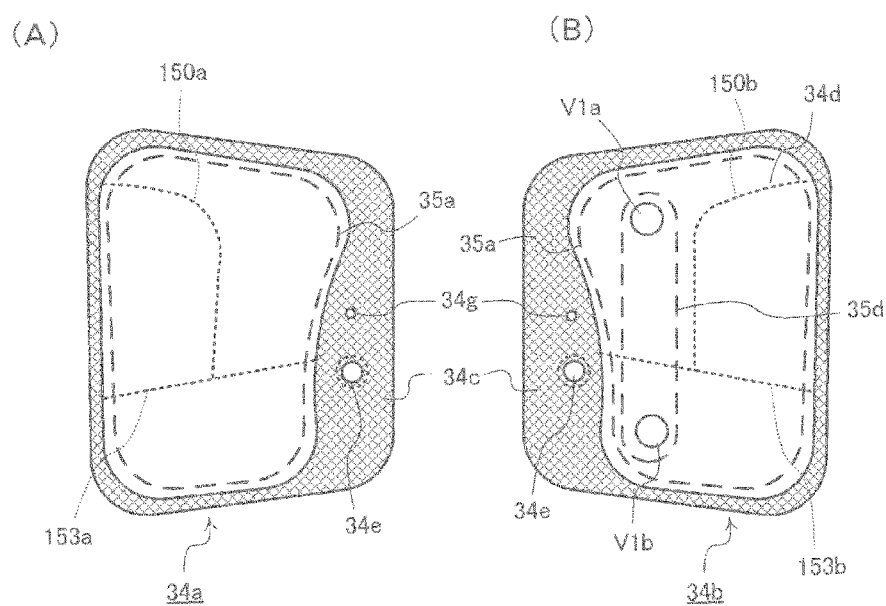
FIGS. 12(A) and 12(B) are plan views showing constituent components of an airbag (a three-chamber structure) used in the occupant protection device according to the third embodiment and illustrating panels forming the main chamber. Note that the components shown in FIGS. 7(A1), 7(A2), 7(B1), 7(B2) and 7(C) may be applied as the panels forming the sub-chamber and the connecting panel.

FIGS. 11(A) and 11(B) are schematic views showing the deployment state of an airbag device according to a third embodiment of the present invention, FIG. 11(A) corresponding to a cross-section taken in the A2-A2 direction in FIG. 5 and FIG. 11(B) showing a state seen from the vehicle width direction outer side. FIGS. 12(A) and 12(B) are plan views showing constituent components of an airbag (a three-chamber structure) used in the occupant protection device according to the third embodiment and illustrating the panels forming the main chamber. Note that the components shown in FIGS. 7(A1), 7(A2), 7(B1), 7(B2) and 7(C) may be applied as the panels forming the sub-chamber and the connecting panel, and therefore description and illustration thereof have been omitted. Constituent elements that are shared with or correspond to the first and second embodiments, described above, have been allocated identical reference numerals, and duplicate description thereof has been omitted.

This embodiment is an arrangement of the second embodiment, in which the main chamber 34 is divided into three chambers 148a, 148b, and 152. The main chamber 34 is constituted by a lower chamber 152 positioned near the waist portion of the occupant and upper chambers 148a, 148b connected to the top of the lower chamber 152. The upper chambers are constituted by an upper rear chamber 148a, which is positioned at the vehicle rear, and an upper front chamber 148b, which is positioned at the vehicle front, and these chambers 148a, 148b are partitioned by a baffle plate 150. An opening 150a through which the two connected chambers 148a, 148b communicate is formed in the baffle plate 150.

In the example shown in FIGS. 12(A) and 12(B), the three chambers 148a, 148b, 152 are formed by partitioning the main chamber 34 using two inner baffles 150, 153. Note that the three chambers 148a, 148b, 152 constituting the main chamber 34 may be divided by sewing instead of baffle plates. In FIGS. 12(A) and 12(B), dotted lines 150a, 150b indicate positions in which the inner baffle 150 is disposed, and a dotted line 153a indicates a position in which the inner baffle 153 is disposed.

The sub-chamber 36 communicates with the upper rear chamber 148a through a vent hole Va and communicates with the lower chamber 152 through a vent hole Vb. The inflation gas discharged from the inflator 30 flows from the sub-chamber 36 into the upper rear chamber 148a and the lower chamber 152, and then flows from the upper rear chamber 148a into the upper front chamber 148b.

Figure 13:
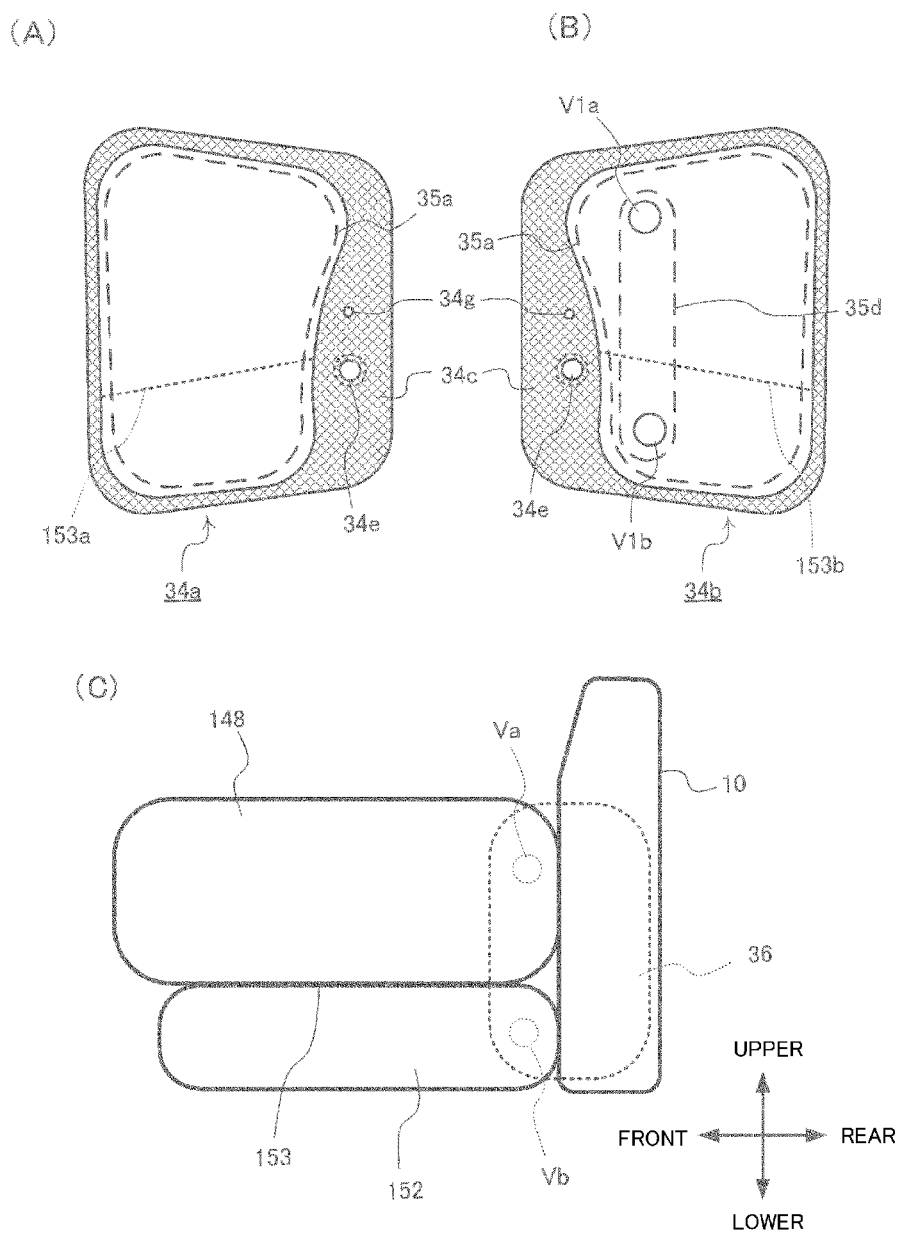
FIGS. 13(A) and 13(B) are plan views showing constituent components of an airbag (a two-chamber structure) used in an occupant protection device according to a fourth embodiment of the present invention and illustrating panels forming the main chamber. Note that the components shown in FIGS. 7(A1), 7(A2), 7(B1), 7(B2) and 7(C) may be applied as the panels forming the sub-chamber and the connecting panel.
FIG. 13(C) shows the deployment state of the airbag from the vehicle width direction outer side.

FIGS. 13(A) and 13(B) are plan views showing constituent components of an airbag (a two-chamber structure) used in an occupant protection device according to a fourth embodiment of the present invention and illustrating the panels forming the main chamber. Note that the components shown in FIGS. 7(A1), 7(A2), 7(B1), 7(B2) and 7(C) may be applied as the panels forming the sub-chamber and the connecting panel, and therefore description and illustration thereof have been omitted. FIG. 13(C) shows the deployment state of the airbag from the vehicle width direction outer side. Constituent elements that are shared with or correspond to the first to third embodiments, described above, have been allocated identical reference numerals, and duplicate description thereof has been omitted.

This embodiment is another arrangement of the first embodiment, in which the main chamber 34 is divided into two chambers 148, 152. The main chamber 34 is constituted by a lower chamber 152 positioned near the waist portion of the occupant and an upper chamber 148 connected to the top of the lower chamber 152.

In the example shown in FIGS. 13(A) and 12(B), the two chambers 148, 152 are formed by partitioning the main chamber 34 using a single inner baffle 153 (153a, 153b). Note that the two chambers 148, 152 constituting the main chamber 34 may be divided by sewing instead of a baffle plate.

The sub-chamber 36 communicates with the upper chamber 148 through a vent hole Va and communicates with the lower chamber 152 through a vent hole Vb. The inflation gas discharged from the inflator 30 flows from the sub-chamber 36 into each of the upper chamber 148 and the lower chamber 152. Note that an opening may be formed in the inner baffle 153 so that the gas flows between the upper chamber 148 and the lower chamber 152. In so doing, the likelihood of a deployment delay in the upper chamber 148, which has a comparative large volume, can be reduced.

Figure 14:
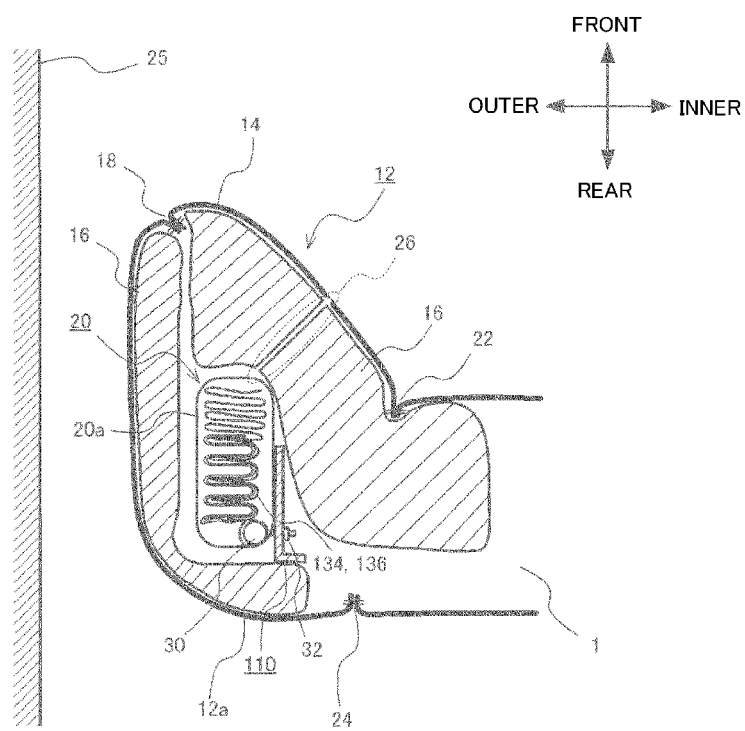
FIG. 14 is a sectional view showing the structure of an occupant protection device according to a fifth embodiment of the present invention and showing to a cross-section taken in the A1-A1 direction in FIG. 3.
Figure 15:
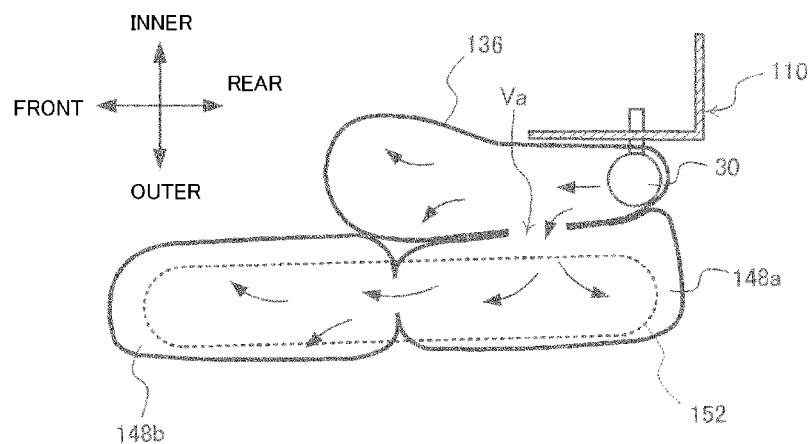
FIGS. 15(A) and 15(B) are schematic views showing the deployment state of an airbag device according to the fifth embodiment of the present invention, FIG. 15(A) corresponding to a cross-section taken in the A2-A2 direction in FIG. 5 and FIG. 15(B) schematically showing a state seen from the vehicle width direction outer side.
Figure 15:
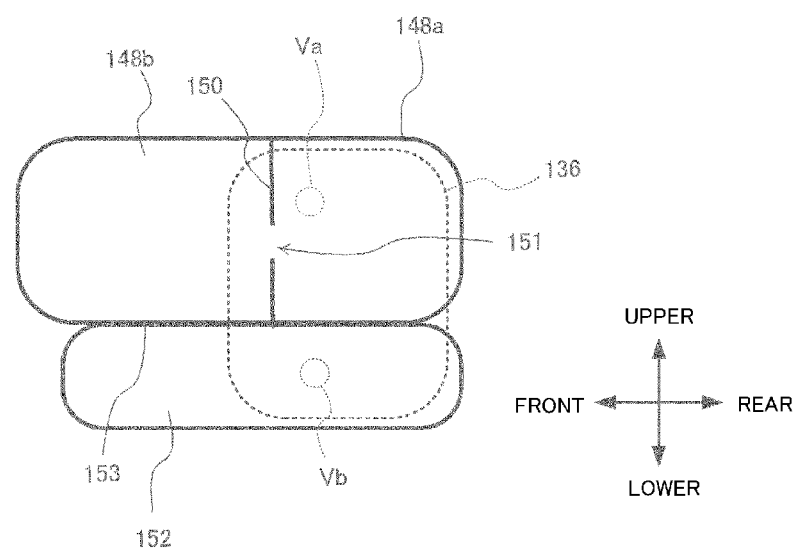
Figure 16:
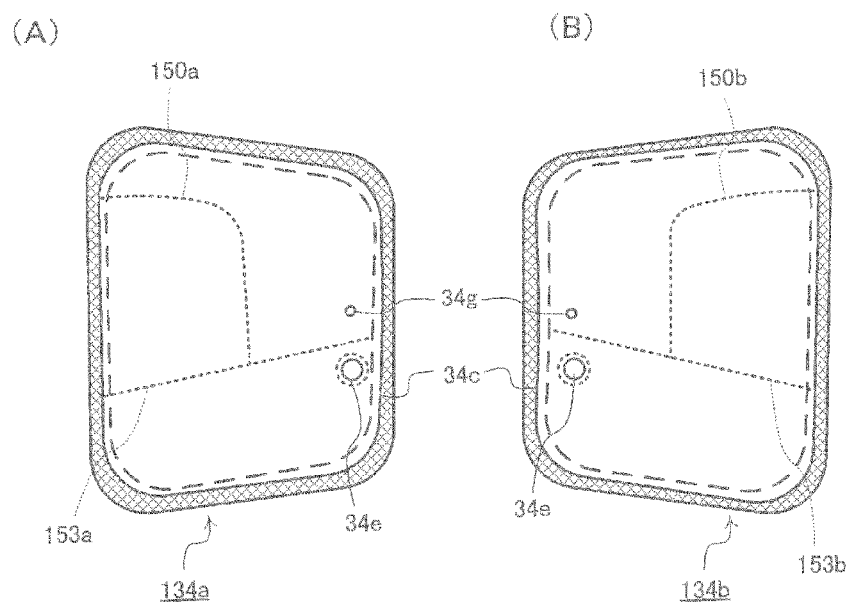
FIGS. 16(A) and 16(B) are plan views showing constituent components of an airbag (a three-chamber structure) used in the occupant protection device according to the fifth embodiment and illustrating panels forming the main chamber. Note that the components shown in FIGS. 7(A1), 7(A2), 7(B1), 7(B2) and 7(C) may be applied as the panels forming the sub-chamber and the connecting panel.
Figure 17:
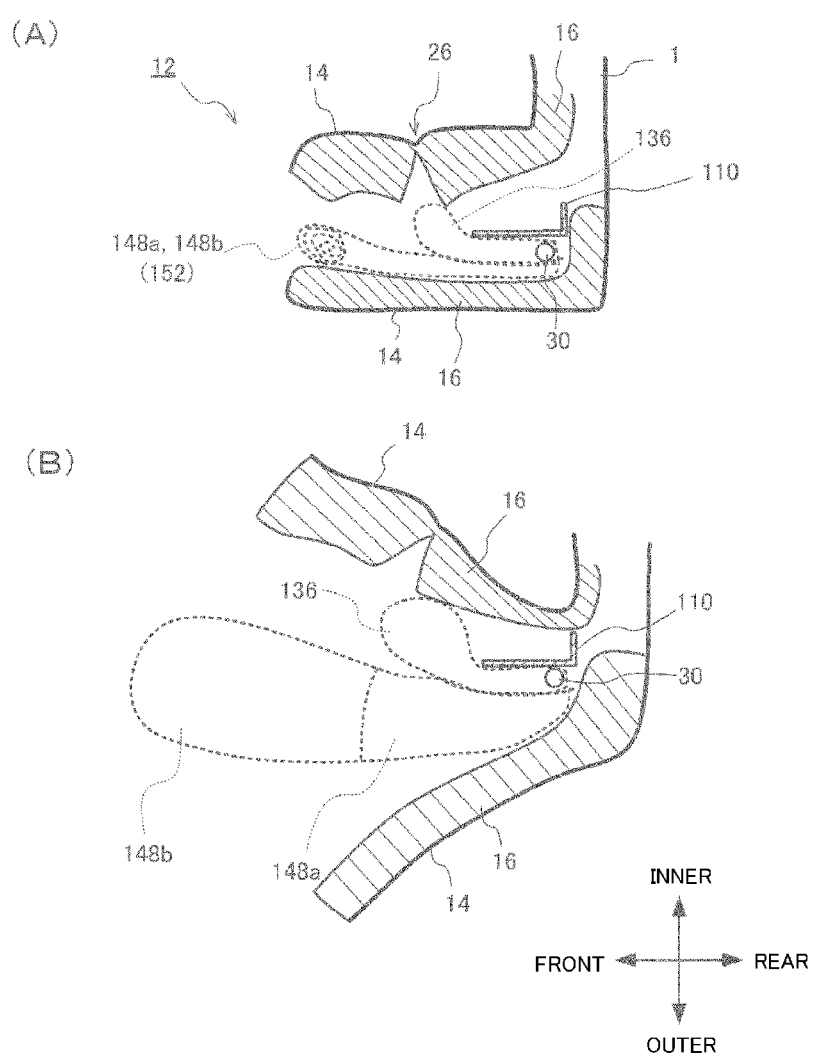
FIGS. 17(A) and 17(B) are illustrative views showing the deployment state of the airbag device according to the fifth embodiment, FIG. 17(A) showing the initial deployment stage and FIG. 17(B) showing the later deployment stage.

FIG. 14 is a sectional view showing the structure of an occupant protection device according to a fifth embodiment of the present invention and showing to a cross-section taken in the A1-A1 direction in FIG. 3. FIGS. 15(A) and 15(B) are schematic views showing the deployment state of an airbag device according to the fifth embodiment of the present invention, FIG. 15(A) corresponding to a cross-section taken in the A2-A2 direction in FIG. 5 and FIG. 15(B) schematically showing a state seen from the vehicle width direction outer side. FIGS. 16(A) and 16(B) are plan views showing constituent components of an airbag (a three-chamber structure) used in the occupant protection device according to the fifth embodiment and illustrating the panels forming the main chamber. Note that the components shown in FIGS. 7(A1), 7(A2), 7(B1), 7(B2) and 7(C) may be applied as the panels forming the sub-chamber and the connecting panel, and therefore description and illustration thereof have been omitted. FIGS. 17(A) and 17(B) are illustrative views showing the deployment state of the airbag device according to the fifth embodiment, FIG. 17(A) showing the initial deployment stage and FIG. 17(B) showing the later deployment stage. Constituent elements that are shared with or correspond to the first to fourth embodiments, described above, have been allocated identical reference numerals, and duplicate description thereof has been omitted.

In this embodiment, as shown in FIG. 15(A), an airbag unit (20) is disposed on the outside of a side frame 110. Further, as shown in FIGS. 16(A) and 16(B), the non-inflating region (34c) shown in FIGS. 12(A) and (B) and so on does not exist in two panels 134a, 134b constituting the main chamber.

In this embodiment, the main chamber (34) is divided into the three chambers 148a, 148b, and 152. The main chamber is constituted by the lower chamber 152 positioned near the waist portion of the occupant and the upper chambers 148a, 148b connected to the top of the lower chamber 152. The upper chambers are constituted by the upper rear chamber 148a, which is positioned at the vehicle rear, and the upper front chamber 148b, which is positioned at the vehicle front, and these chambers 148a, 148b are partitioned by the baffle plate 150. An opening 151 through which the two connected chambers 148a, 148b communicate is formed in the baffle plate 150. This main chamber structure is substantially identical to that of the third embodiment except that the non-inflating region (34c) is not formed.

In the example shown in FIGS. 15(A) and 15(B), the three chambers 148a, 148b, 152 are formed by partitioning the main chamber using the two inner baffles (150, 153). Note that the three chambers 148a, 148b, 152 constituting the main chamber may be divided by sewing instead of baffle plates.

A sub-chamber 136 communicates with the upper rear chamber 148a through the vent hole Va and communicates with the lower chamber 152 through the vent hole Vb. The inflation gas discharged from the inflator 30 flows from the sub-chamber 136 into the upper rear chamber 148a and the lower chamber 152, and then flows from the upper rear chamber 148a into the upper front chamber 148b. At this time, as shown in FIGS. 15(A) and 15(B), a rear side part of the lower chamber 152 and a part of the upper rear chamber 148a deploy so as to overlap the side frame 110 when seen from the vehicle width direction outer side.

In FIGS. 16(A) and 16(B), the dotted lines 150a, 150b indicate the positions in which the inner baffle 150 is disposed, and the dotted line 153a indicates the position in which the inner baffle 153 is disposed. Note that in FIGS. 17(A) and 17(B), the lower chamber 152 actually exists below the upper chambers 148a, 148b (i.e., on a far side of the paper surface), but for convenience, illustration thereof has been omitted.

As shown in FIG. 17(A), in the fifth embodiment of the present invention, configured as described above, during the initial stage of the operation of the airbag device 20, the sub-chamber 136 deploys in the interior of the side support portion 12 so that the seat covering 14 ruptures from the sewed portion 18 while the tip end side of the side support portion 12 deforms using the region 26 as a start point so as to bend or project toward the vehicle inner side, and as a result, the occupant is restrained so as to be pushed toward the vehicle width direction inner side.

Note that at the point where inflation of the sub-chamber 36 is complete, the main chamber 34 (148a, 148b, 152) has not yet finished inflating. The front side part of the side support portion 12 deforms so as to project toward the occupant side, and therefore generation of force for pushing the occupant diagonally frontward from the direction of the back of the occupant can be avoided or suppressed to a minimum. As a result, movement of the occupant in the direction for withdrawing the seatbelt can be avoided. In other words, an optimum restraining performance can be exhibited.

Next, when the inflation gas flows from the sub-chamber 136 into the lower chamber 152 and the upper chambers 148a, 148b of the main chamber, as shown in FIG. 17(B), the three chambers 148a, 148b, 152 inflate so as to be fully deployed toward the front of the vehicle, thereby protecting the occupant during the collision. Note that the lower chamber 152 deploys at least before the upper front chamber 148b so as to restrain the waist portion of the occupant in a similar manner to the sub-chamber 136. At this time, as shown in FIG. 15(B), the lower chamber 152 deploys so as to bulge out further toward the front of the vehicle than the sub-chamber 136, and therefore the waist and thigh portions of the occupant can be restrained over a wide range.

Figure 18:
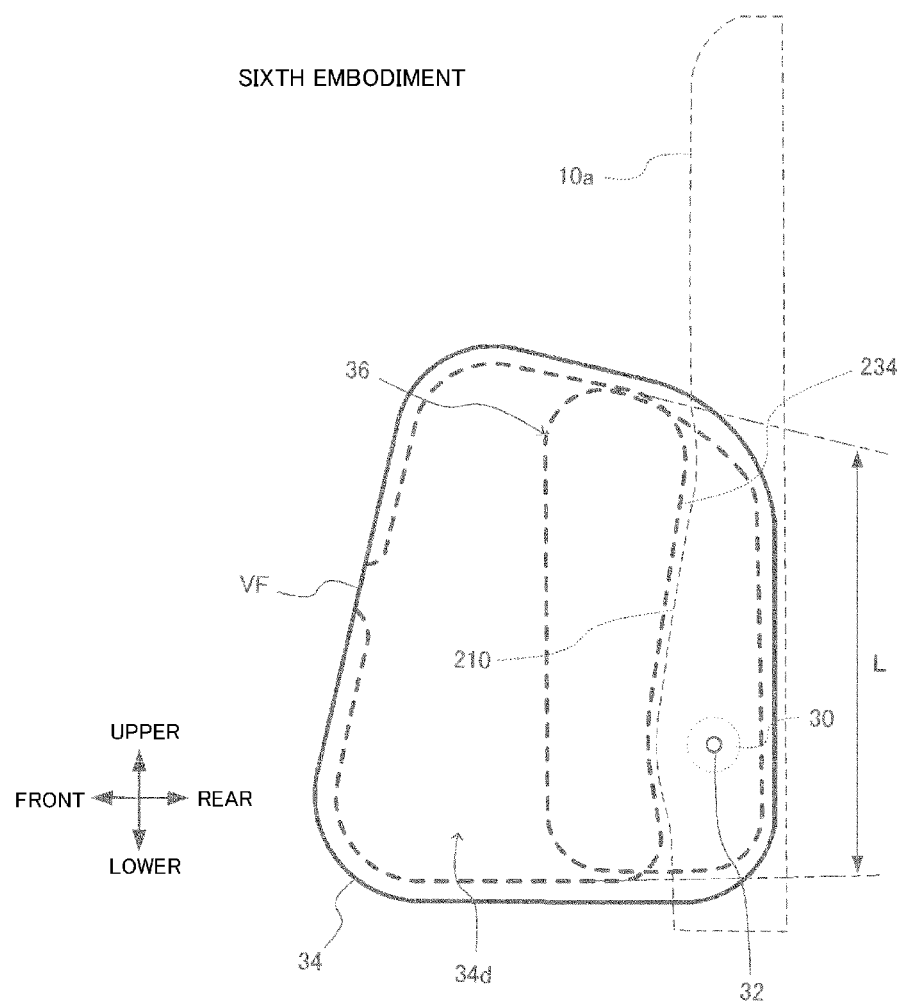
FIG. 18 is a side view showing features of an airbag device according to a sixth embodiment of the present invention and corresponding to a state in which the airbag is inflated.

FIG. 18 is a side view showing features of an airbag device according to a sixth embodiment of the present invention and corresponding to a state in which the airbag is inflated.

The sixth embodiment of the present invention will be described below, focusing on featured parts thereof. Duplicate description of constituent elements that are shared with or correspond to the first to fifth embodiments, described above, has been avoided, but the sixth embodiment may of course be combined with any of the other embodiments.

In this embodiment, when the main chamber 34 is seen from the side of the vehicle, a vehicle rear-side edge 234 thereof deploys so as to follow the shape of a vehicle front-side edge 210 of the frame side wall 10a. This structure can be realized by aligning the shape of the rear edge of the main chamber 34 with the shape of the front edge of the frame side wall 10a or aligning the shape of a rear edge of the inflating region 34d of the main chamber 34 with the shape of the front edge of the frame side wall 10a. Here, when the shape of the rear edge of the inflating region 34d of the main chamber 34 is aligned with the shape of the front edge of the frame side wall 10a, a region to the rear of the inflating region 34d of the main chamber 34 serves as the non-inflating region.

According to this embodiment, when the main chamber 34 deploys toward the front of the vehicle, the rear edge 234 of the main chamber 34 and the front edge 210 of the frame side wall 10a remain in close contact so that the entire front edge of the frame side wall 10a acts as a force-counteracting surface, and as a result, the frontward deployment behavior and deployment shape of the main chamber 34 are stabilized.

Figure 19:
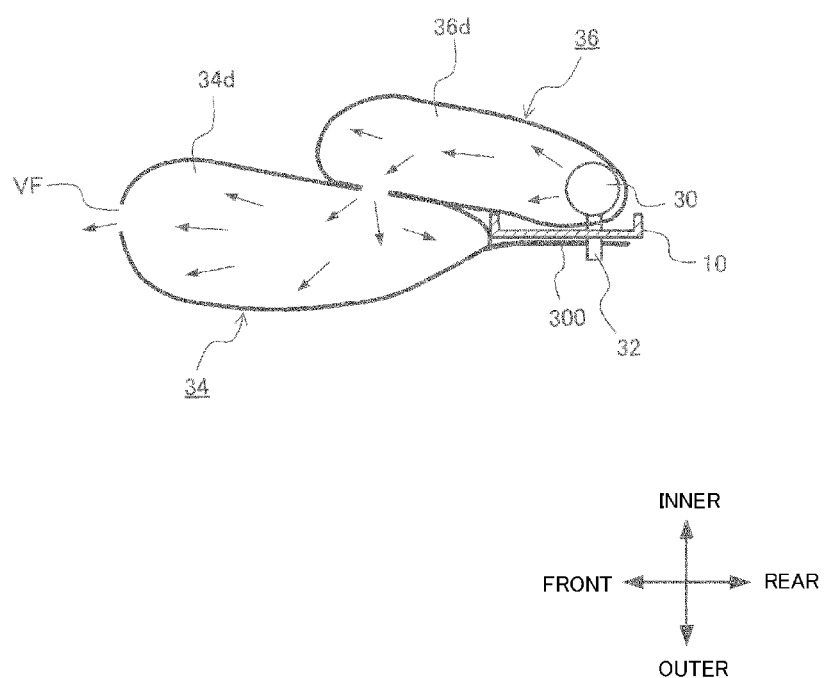
FIG. 19 is a sectional view showing the deployment state of an airbag device according to a seventh embodiment of the present invention and corresponding to a cross-section taken in the A2-A2 direction of FIG. 5.

FIG. 19 is a view showing the deployment state of an airbag device according to a seventh embodiment of the present invention and corresponding to a cross-section taken in the A2-A2 direction of FIG. 5.

The seventh embodiment of the present invention will be described below, focusing on featured parts thereof. Duplicate description of constituent elements that are shared with or correspond to the first to sixth embodiments, described above, has been avoided, but the seventh embodiment may of course be combined with any of the other embodiments.

In this embodiment, a tether 300 that can be fastened to a vehicle rear part of a frame 40 on the vehicle outer side of the frame 10 is provided on a vehicle rear-side end of the main chamber 34. The tether 300 can be fastened to the stud bolt 32 for fixing the inflator 30 to the frame 10, for example. Further, the tether 300 can be formed in the shape of a strip having a substantially constant width or a triangle that gradually narrows toward the rear.

According to this embodiment, by fixing the rear end of the main chamber 34 using the tether 300, the front-rear direction deployment behavior and deployment shape of the main chamber 34 can be restricted.

The present invention was described in relation to the above exemplary embodiments, but many equivalent modifications and amendments will be apparent to a person skilled in the art from the present disclosure. Accordingly, the above embodiments of the present invention are to be considered exemplary but not limiting. Various modifications may be applied to the above embodiments without departing from the spirit and scope of the present invention. For example, the description of the preferred embodiments focused on a near-side side airbag, but the present invention may also be used with a far-side side airbag (on the surface of the vehicle seat on the far side of the vehicle door), a single-seat vehicle (a vehicle including a part in which only one seat is provided in one row, regardless of the presence or absence of a door) such as a small mobility scooter or other very small vehicle, and so on.

While the above description constitutes the preferred embodiment of the present invention, it will be appreciated that the invention is susceptible to modification, variation and change without departing from the proper scope and fair meaning of the accompanying claims.

The invention claimed is:

1. An occupant protection device for restraining an occupant of a vehicle, comprising:
   a vehicle seat that includes a seat cushion forming a seating surface, and a seatback forming a backrest; and a side airbag device housed in the seat,
   wherein the seatback includes a side support portion that bulges out in a vehicle advancement direction on a vehicle width direction side portion thereof, and
   a side frame having a frame side wall disposed in a plane parallel to the vehicle advancement direction,
   the side airbag device includes an airbag deployable to restrain the occupant, and an inflator provided on a vehicle width direction inner side of the frame side wall for supplying an inflation gas to the airbag,
   the airbag includes a main chamber that deploys toward a front of the side support portion, and a sub-chamber that houses the inflator and deploys on the vehicle width direction inner side of the main chamber,
   an internal vent hole through which the inflation gas flows from the sub-chamber into the main chamber is provided in a partition between the main chamber and the sub-chamber,
   wherein the inflator is disposed in the sub-chamber and the sub-chamber is deployable in the vehicle advancement direction overlap the frame side wall in a vehicle width direction, and
   wherein the main chamber is deployable in the vehicle advancement direction without overlapping the frame side wall in the vehicle width direction.

2. The occupant protection device according to claim 1, wherein upon deployment of the airbag, the partition is oriented parallel to the frame side wall, the main chamber is disposed on a first side of the partition and the sub-chamber is disposed on a second, opposite side of the partition.

3. The occupant protection device according to claim 1, wherein the main chamber is laterally deployable in a first lateral direction and the sub-chamber is laterally deployable in a second, opposite lateral direction.

4. An occupant protection device for restraining an occupant of a vehicle, comprising:
   a vehicle seat that includes a seat cushion forming a seating surface, and a seatback forming a backrest; and a side airbag device housed in the seat,
   wherein the seatback includes a side support portion that bulges out in a vehicle advancement direction on a vehicle width direction side portion thereof,
   a side frame having a frame side wall that extends in the vehicle advancement direction when a horizontal section is seen from above is disposed in an interior of the side support portion,
   the side airbag device includes an airbag that deployable to restrain the occupant, and an inflator provided on a vehicle width direction inner side of the frame side wall for supplying an inflation gas to the airbag,
   the airbag includes a main chamber that deploys toward a front of the side support portion, and a sub-chamber that houses the inflator and deploys on the vehicle width direction inner side of the main chamber,
   an internal vent hole through which the inflation gas flows from the sub-chamber into the main chamber is provided in a partition between the main chamber and the sub-chamber,
   the sub-chamber is provided so as to deploy while overlapping the frame side wall when seen from a side of the vehicle, and
   the main chamber includes a non-inflating region in a part that overlaps the frame side wall when seen from the side of the vehicle.

5. The occupant protection device according to claim 4, wherein the sub-chamber is deployable on a seat center side of a vehicle advancement direction extension line of the frame side wall, and
   the main chamber is pushed by deployment of the sub-chamber toward a vehicle width direction outer side so as to deploy on a front side of the frame side wall.

6. The occupant protection device according to claim 4, wherein the side airbag device is housed on a vehicle width direction outer side of the frame side wall.

7. The occupant protection device according to claim 4, further comprising, a tether fastened to a vehicle rear part of the frame side wall on a vehicle outer side of the frame side wall on a vehicle rear-side end of the main chamber.

8. The occupant protection device according to claim 7, wherein the tether is fastened to a stud bolt for fixing the inflator to the frame in the vehicle rear part.

9. The occupant protection device according to claim 4, wherein the sub-chamber is disposed at least in a lower portion of the side support portion so that when the sub-chamber deploys, a waist portion of the occupant is pushed by the side support portion.

10. The occupant protection device according to claim 4, wherein the sub-chamber deploys only in an interior of the side support portion.

11. The occupant protection device according to claim 4 wherein the sub-chamber is deployable prior to deployment of the main chamber.

12. The occupant protection device according to claim 4 further comprising, a start point region that serves as a start point when the side support portion bends toward an occupant side in response to inflation of the sub-chamber is formed in the side support portion.

13. The occupant protection device according to claim 12, wherein the start point region is in a form of a notch, a recess, a reduced-thickness region, or a combination thereof.

14. The occupant protection device according to claim 4 comprising, webbing that covers at least a part of the main chamber and the sub-chamber.

15. The occupant protection device according to claim 14, wherein the webbing includes a fragile portion that serves as a rupturing start point when the sub-chamber deploys.

16. The occupant protection device according to claim 14, wherein the webbing includes a first webbing positioned on a vehicle outer side of the side airbag, and a second webbing positioned on a vehicle inner side of the side airbag.

17. An occupant protection device for restraining an occupant of a vehicle comprising:
   a vehicle seat that includes a seat cushion forming a seating surface, and a seatback forming a backrest; and
   a side airbag device housed in the seat,
   wherein the seatback includes a side support portion that bulges out in a vehicle advancement direction on a vehicle width direction side portion thereof,
   a side frame having a frame side wall that extends in the vehicle advancement direction when a horizontal section is seen from above is disposed in an interior of the side support portion,
   the side airbag device includes an airbag deployable to restrain the occupant, and an inflator provided on a vehicle width direction inner side of the frame side wall for supplying an inflation gas to the airbag,
   the airbag includes a main chamber that deploys toward a front of the side support portion, and a sub-chamber that houses the inflator and deploys on the vehicle width direction inner side of the main chamber,
   an internal vent hole through which the inflation gas flows from the sub-chamber into the main chamber is provided in a partition between the main chamber and the sub-chamber, and
   the main chamber has vehicle rear-side edge upon deployment, when seen from a side of the vehicle, following a shape of a vehicle front-side edge of the frame side wall.

18. The occupant protection device according to claim 17, wherein the vehicle rear-side edge of the main chamber is closely aligned with the vehicle front-side edge of the frame side wall upon deployment of the airbag.

19. The occupant protection device according to claim 18, wherein the vehicle front-side edge of the frame side wall defines a force-counteracting surface for the vehicle rear-side edge of the main chamber for stabilizing a deployment shape of the main chamber.

20. The occupant protection device according to claim 18, wherein the vehicle front-side edge of the frame side wall includes a convexly curved portion and the vehicle rear-side edge of the main chamber includes a correspondingly shaped, concavely curved portion.

* * * * *